United States Patent Office 2,852,559
Patented Sept. 16, 1958

2,852,559

MANUFACTURE OF MALONIC ACID AND ITS ESTERS AND SALTS

David O. De Pree and William R. Eller, Baton Rouge, La., assignors to Ethyl Corporation, New York, N. Y., a corporation of Delaware No Drawing. Application October 30, 1956
Serial No. 619,114

4 Claims. (Cl. 260—537)

This invention is concerned with the manufacture of malonic acid and its esters and salts. In particular, it is concerned with the preparation of these materials by the reaction of carbon dioxide with specific organometallic compounds.

It has long been known that salts of organic acids can be prepared by the reaction of certain organometallic compounds with carbon dioxide under particular conditions. For example, sodium acetylide, when reacted with carbon dioxide under particular conditions, produces the sodium salt of propiolic acid which can be readily converted to the acid itself. Likewise, compounds such as benzyl sodium and amyl sodium have been reacted with carbon dioxide to produce the corresponding salt of the acid. More recently, it has been reported that an intermediate compound, α-sodio sodium caproate, was formed when reacting sodium caproate concurrently with sodium in benzene and passing amyl chloride through the reaction mixture. The sodium reacts with the amyl chloride to produce amyl sodium and sodium chloride. The amyl sodium then reacts with sodium caproate to produce α-sodio sodium caproate. Both reactions are conducted in situ and carbon dioxide is passed through the mixture, thus resulting in the salt of butylmalonic acid. These reactions are conducted at comparatively mild temperatures, that is, about 70° C. and lower.

However, to the best of our knowledge, the employment of a similar such technique for the direct preparation of the metal salts of malonic acid has not been accomplished. The most efficiently known method for the preparation of malonic acid at present comprises first preparing chloroacetic acid and reacting it with sodium cyanide to produce cyanoacetic acid. The cyanoacetic acid is then hydrolized and malonic acid is then recovered by extraction techniques. This procedure is quite tedious and costly. Accordingly, it is highly desirable to the industry to provide a new and more economical process for the production of this valuable material.

It is, therefore, an object of this invention to provide a novel process for the manufacture of salts and esters of malonic acid and malonic acid itself. A still further object of this invention is to provide a more economical and simplified process for the preparation of malonic acid. A more specific object is to provide a process for the preparation of the sodium salts of malonic acid by reacting α-sodio-sodium acetate with carbon dioxide. These and other objects of this invention will be apparent from the description hereinafter.

The novel process of this invention comprises reacting α-metallo-metallic acetates containing two carbon atoms and wherein the metallic elements are selected from the group consisting of alkali and alkaline earth metals with carbon dioxide at a temperature of at least about 140° C., but below the decomposition temperature of the metallic acetate reactant. It has been found that the heretofore known conditions for the reaction of compounds containing metal to carbon bonds with carbon dioxide to produce the salt of the corresponding acid are not applicable for reaction of carbon dioxide with the α-metallo-metallic acetate. The reaction in this instance does not commence until a temperature of about 140° C. is obtained. In a particularly preferred embodiment of this invention, the reaction is conducted at temperatures between about 180 to 220° C.

Thus, the process of this invention provides a new and direct method for the preparation of salts of malonic acid. The salts can be employed as such or readily converted to the acid or ester by acidification or esterification techniques. In effect, the process of this invention results in the employment of more economical materials and operating conditions than those employed in the present commercial process for the production of malonic acid.

The present invention will be more completely understood by reference to the following examples. In each instance, all parts and percentages are by weight unless otherwise specified.

Example I

α-Sodio-sodium acetate was prepared by reacting 2 moles of sodium amide with 2 moles of anhydrous sodium acetate in a nitrogen purged reaction vessel. A preblend of these materials in a charging vessel was continuously fed to the reactor at a rate such that with external heating, the temperature could be maintained between 185 and 235° C. The ammonia which was liberated was continuously withdrawn. The overall reaction required about 1 hour. The α-sodio sodium acetate thus obtained was transferred to the charging head of the reactor. The reactor was then heated to 213° C. and continuously swept with carbon dioxide while slowly charging the α-sodio sodium acetate to the reactor. After 10 minutes of such procedure, the carbon dioxide was taken up as rapidly as it could be fed. Five minutes later, addition of the α-sodio sodium acetate was complete and the reactor was cooled and discharged. Analysis of the product by cerate oxidimetry (G. F. Smith, "Cerate Oxidimetry," page 114) indicated a yield of 71% of disodium malonate based on the α-sodio-sodium acetate. The disodium malonate was readily converted to malonic acid by acidifying with hydrochloric acid and extracting with 3 portions of diethyl ether and then evaporating the diethyl ether.

When numerous runs were conducted, in order to determine the temperature range at which the carbon dioxide was taken up and reacted, by gradual heating of a portion of α-sodio-sodium acetate in a carbon dioxide atmosphere, it was found that the reaction commenced at about 140° C.

Example II

By following the procedure of the preceding example with the exception that 19.1 parts of α-sodio sodium acetate suspended in tetralin were continuously fed to the reactor while maintaining the temperature in the reactor between 194 and 207° C. with a total reaction time of 4 hours, disodium malonate was obtained in high yield.

Example III

The procedure of Example I was followed with the exception that in this instance, a high pressure reactor was employed. When charging 10 parts of α-sodio sodium acetate and maintaining the temperature at 176° C. with the carbon dioxide atmosphere under pressure at 700 p. s. i. g., disodium malonate was obtained in a similar yield after a reaction period of 5 hours although the reaction, from temperature and pressure observations, appeared complete in 30 minutes.

Example IV

When α-lithio-lithium-acetate is reacted with carbon dioxide essentially as described in Example I, dilithium malonate is obtained in high yield.

Example V

When α-calcio-sodium-acetate is reacted with carbon dioxide at a temperature of 200° C. and atmospheric pressure, sodium calcium malonate is obtained in high yield.

The foregoing examples are presented merely as typical illustrations of the process of the present invention and it is not intended that they are to be limited thereby.

The α-metallo-metallic acetates are compounds containing two carbon atoms and in which the metallic elements are selected from the group consisting of alkali and alkaline earth metals. These compounds can be depicted by the following structural formula:

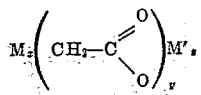

wherein M and M' can be the same or different and are alkali or alkaline earth metals and $x$, $y$, and $z$ are small whole numbers dependent upon the valence of M and M'. The alkali metals are intended to include the metals of group I of the periodic chart of the elements. Likewise, the alkaline earth metals include the metals of group II–A of the periodic chart as set forth in the Handbook of Chemistry and Physics, 35th ed., Chemical Rubber Publishing Co., at page 392. Thus, among the compounds thereby described which can be substituted for the α-metallo-metallic acetate employed in the preceding examples are included α-sodio-potassium acetate, α-lithio-potassium acetate, α-potassio-potassium acetate, α-sodio-calcium acetate, α-lithio-barium acetate, α-calcio-sodium acetate, α-bario-cerous acetate, and the like wherein the other alkali and alkaline earth metals are substituted for the metals named hereinbefore.

In general, pressure is not required to conduct the process of this invention. However, as indicated in Example III, higher pressures can be employed to accelerate the reaction to a certain degree. In general, pressures of atmospheric and higher can be employed. Ordinarily, the pressure will be between about atmospheric and 1500 p. s. i .g. For more economical operation but with rapid reaction rate, it is preferred to employ a pressure between about atmospheric and 1000 p. s. i .g. Thus, any of the aforementioned examples can be repeated employing pressures of 10, 40, 50, 100, 500, and 1000 p. s. i. g. to produce similar results.

The proportions of the reactants are not critical and, in general, are determined by the take-up of the carbon dioxide by the α-metallo-metallic acetate. Hence, all that is basically required is to maintain an atmosphere of the carbon dioxide present in the reactor employed. Thus, an excess of the carbon dioxide is used but such excess is readily recovered and reused.

The reaction time is generally determined by the rate of consumption of the carbon dioxide under the conditions of reaction. Hence, when it is evident that no more carbon dioxide is being consumed in reaction, the reaction is complete. Ordinarily, the reaction time required will vary from about ½ minute to 10 hours. It is preferred, however, to employ a reaction period of between ½ minute to 5 hours. If the temperature of the reaction is above about 200° C., the reaction is preferably terminated within about 2 hours in order to avoid decomposition of the product.

Although not required, it is sometimes advantageous to employ a diluent when conducting the reaction. For example, the α-metallo-metallic acetate can be suspended in any essentially inert organic diluent which is liquid under the reaction conditions. For such purpose, the hydrocarbons and ethers can be employed, generally those containing less than 18 carbon atoms. Typical examples of such diluents include the pentanes, hexanes, nonanes, and the like up to and including octadecane; benzene, toluene, tetralin, mineral oil, gasoline and the like; and ethers such as diamyl ether, dimethyl ether of ethylene glycol and diethylene glycol, dioxane, tetrahydrofuran and the like. The hydrocarbon diluents are particularly preferred because of their lesser reactivity and greater availability.

The metal salt of malonic acid as directly prepared in the reaction can be employed without further purification. In order to convert it to malonic acid, which is a particularly preferred embodiment of this invention, it is dissolved in water, then acidified with an inorganic acid such as hydrochloric, sulphuric, phosphoric, and the like acids. The acid is then extracted from the water solution with suitable extractants. For this process, the various ethers and esters can be employed. Typical examples of such are diethyl ether, dimethyl ether, the methyl and ethyl ethers of ethylene glycol and diethylene glycol, methyl acetate, isopropyl acetate, propyl acetate, amyl acetate, methyl propionate and the butyrates, caproates, and the like. Isopropyl acetate has been found to be particularly suitable. The extractant is then distilled from the malonic acid.

A still further method for recovering the malonic acid value is to esterify the metal salt obtained from the reaction with esterifying agents such as alkyl sulfates and halides. This procedure is particularly preferred since it results in the corresponding ester of malonic acid which is the form in which this acid is generally employed in the industry. Further, it is a more practical and efficient method for recovering the malonic acid value, in view of the reactivity of this acid in water-acid solutions. Typical such esterifying materials include dimethyl, diethyl, dipropyl, dibutyl, and the like alkyl sulfates; and the alkyl halides such as methyl, ethyl, butyl, propyl, amyl, hexyl, and the like chlorides, bromides, and iodides having up to about 8 carbon atoms. A typical example of this method of utilization of disodium salt of malonic acid as prepared in Example I is as follows.

Example VI

One hundred forty-eight parts of disodium malonate are suspended in 800 parts of xylene. The mixture is heated to the reflux temperature. Then 252 parts of dimethyl sulfate are added slowly. The mixture is maintained at this temperature for about 3 hours, then filtered to remove the sulfate salt. The dimethyl ester of malonic acid is recovered from the xylene in high yield by vacuum distillation.

As noted in the preceding example, two moles of the sulfate are employed per mole of the disodium malonate. In general, between about 1 to 3 moles of the esterifying reagent are employed per mole of the malonate salt. When higher temperatures, as between 140 to 200° C., are employed in place of the temperature in the preceding example, generally between about 1 and 2 moles of the esterifying reagent are sufficient. On the other hand, when alkyl halides are employed in place of the sulfates, it is preferred to use between about 2 to 3 mols thereof per mole of the malonate salt at a temperature between about 140 to 200° C., generally in a closed system or under pressure.

The products produced according to this invention are of considerable utility. For example, the malonic esters, produced as described above, can be reacted with urea, as set forth by Feiser and Feiser, "Organic Chemistry," 3rd edition, at page 246, to produce barbituric acid whose derivatives are useful as soporifics. The esters of malonic acid and the acid itself can be reacted with dihydrazides as described in U. S. Patent 2,615,862 to produce thermoposition temperature of said α-metallo-metallic acetate.

Having thus described the process of this invention, it is

We claim:
1. A process for the preparation of metal salts of malonic acid which comprises reacting an α-metallo-metallic acetate containing two carbon atoms wherein the metallic elements are selected from the group consisting of alkali and alkaline earth metals with carbon dioxide at a temperature above about 140° C.

2. A process for the preparation of metallic salts of malonic acid which comprises reacting an α-metallo-metallic acetate containing two carbon atoms wherein the metallic element is selected from the group consisting of alkali and alkaline earth metals with carbon dioxide at a temperature above about 140° C., but below the decomposition temperature of said α-metallo-metallic acetate.

3. A process for the preparation of disodium malonate which comprises reacting α-sodio-sodium acetate with carbon dioxide at a temperature between about 180–220° C.

4. A process for the preparation of malonic acid which comprises reacting α-sodio-sodium acetate with carbon dioxide at a temperature between about 180–220° C., and converting the disodium malonate thereby obtained to malonic acid by acidification.

References Cited in the file of this patent
UNITED STATES PATENTS

| | | |
|---|---|---|
| 2,163,846 | Morton | June 27, 1939 |
| 2,773,092 | Carley et al. | Dec. 4, 1956 |

OTHER REFERENCES

Morton et al.: J. A. C. S., vol. 60, June 1938, pp. 1426–9.

UNITED STATES PATENT OFFICE
Certificate of Correction

Patent No. 2,852,559                                                    September 16, 1958

David O. De Pree et al.

It is hereby certified that error appears in the printed specification of the above numbered patent requiring correction and that the said Letters Patent should read as corrected below.

Column 4, line 74, strike out "position temperature of said a-metallo-metallic acetate." and insert instead *plastic polymers. These and other uses will be evident.*

Signed and sealed this 3rd day of February 1959.

[SEAL]

Attest:
KARL H. AXLINE,
*Attesting Officer.*

ROBERT C. WATSON,
*Commissioner of Patents.*